United States Patent [19]

Lince

[11] Patent Number: 5,227,892
[45] Date of Patent: Jul. 13, 1993

[54] METHOD AND APPARATUS FOR IDENTIFYING AND SELECTING EDIT PAINTS IN DIGITAL AUDIO SIGNALS RECORDED ON A RECORD MEDIUM

[75] Inventor: Robin L. Lince, Basingstoke, United Kingdom

[73] Assignee: Sony Broadcast & Communications Ltd., Basingstoke, England

[21] Appl. No.: 705,500

[22] Filed: May 24, 1991

[30] Foreign Application Priority Data

Jul. 6, 1990 [GB] United Kingdom ............... 9104954

[51] Int. Cl.⁵ .................. H04N 9/79; H04N 5/76
[52] U.S. Cl. .................... 358/335; 358/311; 360/13; 360/14.3
[58] Field of Search .......... 358/310, 311, 335, 341, 358/342, 343, 312; 360/10.1, 10.2, 10.3, 13, 14.1, 14.2, 14.3

[56] References Cited

U.S. PATENT DOCUMENTS

| | | | |
|---|---|---|---|
| 4,363,049 | 12/1982 | Ohtsuki et al. | 360/13 |
| 4,618,895 | 10/1986 | Wright | 358/311 |
| 4,698,664 | 10/1987 | Nichols et al. | 358/311 |
| 4,858,033 | 8/1989 | Chippendale | 360/14.2 |
| 4,868,687 | 9/1989 | Penn et al. | 360/13 |
| 4,951,155 | 8/1990 | Andrews | 358/342 |
| 4,970,602 | 11/1990 | Yoshio | 358/342 |
| 5,006,939 | 4/1991 | Cawley | 360/14.1 |

Primary Examiner—Tommy Chin
Assistant Examiner—Thai Tran
Attorney, Agent, or Firm—William S. Frommer; Alvin Sinderbrand

[57] ABSTRACT

Apparatus for identifying edit points in a digital audio signal recorded on a record medium in association with a video signal and a time code signal, comprises a random access memory (3) for storing a reproduced segment of the digital audio signal and the associated time code signal, a monitor (2) for displaying the image corresponding to a reproduced portion of the associated video signal, a digital-to-analog converter for converting that part of the segment of the digital audio signal corresponding to the displayed image and read from the random access memory (3) by reference to the stored time code for reproduction by a loudspeaker (4), a video screen (6) for displaying the waveform of the analog-converted audio signal with a cursor (8) which relates the waveform to the image displayed on the monitor (2), and a register (7) for recording the time code read from the random access memory (3) and corresponding to a required audio edit point at which the cursor is positioned.

10 Claims, 1 Drawing Sheet

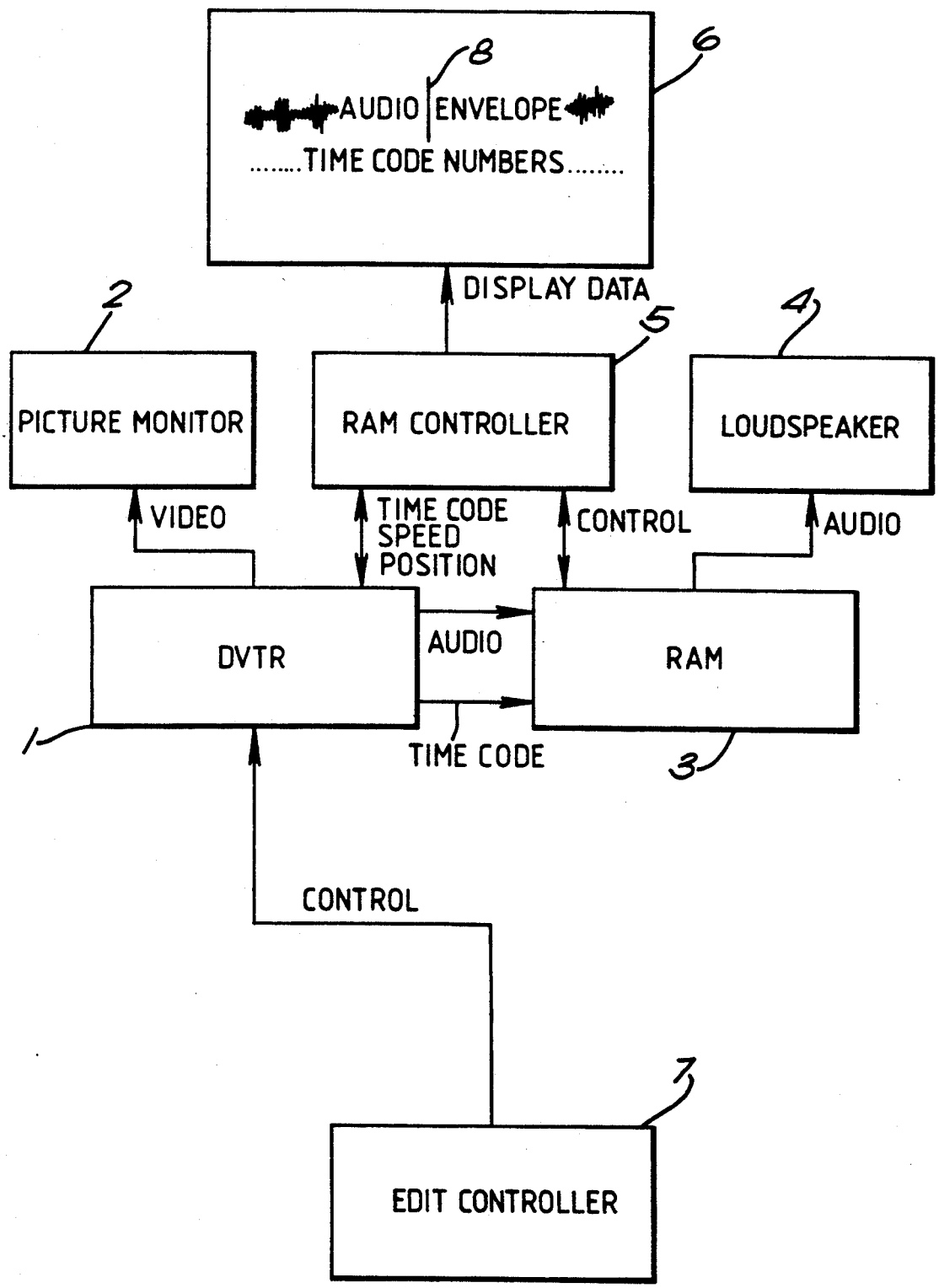

METHOD AND APPARATUS FOR IDENTIFYING AND SELECTING EDIT PAINTS IN DIGITAL AUDIO SIGNALS RECORDED ON A RECORD MEDIUM

BACKGROUND OF THE INVENTION

1. Field of the Invention

This invention relates to methods of and apparatus for editing a digital audio signal recorded on a record medium in association with a video signal.

2. Description of the Prior Art

Years ago, the editing of an analog audio signal recorded in a longitudinal track on a video magnetic tape wound on open reels, and having the associated video signal recorded in oblique tracks on the tape, was done by rocking the tape to and fro by manually rotating the reels, while listening to the reproduced audio signal. In this way, the gap between words or between effects noises could be found, and the tape marked with a chinagraph pencil.

More recently this crude method has given way to a method where the tape movement is controlled by a jog knob. Moreover if the video signal recorded in association with the audio signal has a vertical interval time code (VITC), the VITC can be read even from a stationary tape to identify precise time positions for accurate and repeatable cueing and synchronization.

The problem now arises with modern digital video tape recorders (DVTRs), that the audio channels, which are recorded as digital data blocks at the beginning and/or the end and/or an intermediate position of each oblique track on the tape, cannot be read at non-play or jog speeds.

To overcome this problem, it has been proposed to use the audio signal recorded in the longitudinal analog tracks on the tape, the tape being moved under control of the jog knob to find the edit points. However, this solution is inapplicable where the audio signal to be edited only exists in the digital channels in the oblique tracks. Moreover, the operation of the job knob may not feel right to the operator, leading to slow operation and errors. This is because pulses generated on movement of the job knob are supplied via a microprocessor to control a tape transport servo. Depending on the time delays involved and the torque of the servo, the operation can feel spongy and imprecise, leading to difficulty in locating edit points accurately.

SUMMARY OF THE INVENTION

One object of the present invention is to provide an improved method of identifying edit points in a digital audio signal recorded on a record medium in association with a video signal and a time code signal.

Another object of the present invention is to provide a method of identifying edit points in a digital audio signal recorded on a record medium in association with a video signal and a time code signal, the method overcoming the above problem.

Another object of the present invention is to provide improved apparatus for identifying edit points in a digital audio signal recorded on a record medium in association with a video signal and a time code signal.

According to the present invention there is provided a method of identifying edit points in a digital audio signal recorded on a record medium in association with a video signal and a time code signal, the method comprising: reading a segment of said digital audio signal and the associated time code signal into a random access memory; reproducing said associated video signal and displaying the corresponding image on a monitor; reading that part of said segment of said digital audio signal which corresponds to said displayed image, from said random access memory, by reference to the stored time code; digital-to-analog converting the read digital audio signal and reproducing the converted audio signal audibly; displaying the waveform of said converted audio signal with a cursor which relates said waveform to said displayed image; and recording said time code corresponding to a required audio edit point at which said cursor is positioned.

According to the present invention there is also provided apparatus for identifying edit points in a digital audio signal recorded on a record medium in association with a video signal and a time code signal, the apparatus comprising: a random access memory for storing a reproduced segment of said digital audio signal and the associated time code signal; a monitor for displaying the image corresponding to a reproduced portion of said associated video signal; means for reading that part of said segment of said digital audio signal which corresponds to said displayed image, from said random access memory, by reference to the stored time code; a digital-to-analog converter for converting said read digital audio signal; means for reproducing said converted audio signal audibly; a video screen for displaying the waveform of said converted audio signal with a cursor which relates said waveform to the image displayed on said monitor; and means for recording said time code corresponding to a required audio edit point at which said cursor is positioned.

The above and other objects, features and advantages of this invention will be apparent from the following detailed description of illustrative embodiments which is to be read in connection with the accompanying drawing.

BRIEF DESCRIPTION OF THE DRAWING

The single FIGURE shows an embodiment of apparatus for identifying edit points in a digital audio signal recorded on a record medium in association with a video signal and a time code signal, and in accordance with the invention.

DESCRIPTION OF THE PREFERRED EMBODIMENTS

The invention will be described as applied to a DVTR 1 wherein a digital video signal is recorded with a number of channels of digital audio signal in oblique tracks on a magnetic tape housed in a cassette. Also recorded in the oblique tracks is a time code signal in the form of a VITC which identifies the time in hours, minutes and seconds, and the frame number. In all play modes, including the still mode, the DVTR 1 supplies a reproduced video signal to a picture monitor 2 to display the corresponding image.

In the normal DVTR play mode, reproduced digital audio signals and the associated reproduced time code signal are also supplied by the DVTR 1 to a random access memory (RAM) 3. The RAM 3 is preferably a multi-channel device having, in addition to a time code channel, one channel for each audio channel of the DVTR 1; which may be four for a standard DVTR and eight for a high definition DVTR. On the output side of the RAM 3 is an analog-to-digital conversion device for converting read digital audio signals to analog form for supply to at least one loudspeaker 4, and via a RAM controller 5 to an editor's audio decision making video screen 6.

The RAM controller 5 comprises a microprocessor, and controls reading and supply of audio data from the RAM 3 to the video screen 6. It also receives the current times code signal from the DVTR 1 together with data giving the tape speed and position, the position being derived, for example, from capstan pulses to give more accurate positional information than the time code.

Finally, there is an edit controller 7 connected to the DVTR 1 and comprising a microprocessor and a register for storing edit points in the form of time codes.

The operation is as follows. The video screen 6 displays a time graph, preferably also with time codes in numerical form derived from the DVTR 1, above which is displayed the waveform of the envelope of the analog converted audio signal of the channel of interest, derived from the RAM 3 by reference to the stored time code. A cursor 8 shows the operator the relationship between the audio noises (that is, all sounds, such as speech or effects noises) and the video picture currently being displayed. As a jog knob on the DVTR 1 or on the edit controller 7 is moved, so moving the tape and changing the picture displayed on the picture monitor 2, the cursor 8 moves back and forth over the waveform and the audio noises are reproduced by the loudspeaker 4. As an alternative, the cursor 8 may remain still while the waveform moves.

In more detail, when the DVTR 1 is in play mode, the reproduced digital audio signals are automatically supplied to and stored in the RAM 3, which may, for example, have a capacity to store a segment consisting of thirty seconds for each audio channel. When the RAM 3 is full, incoming signals over-write the oldest stored signals. The RAM 3 is indexed by the time code signal also supplied from the DVTR 1, such that the recorded audio signals, or at least one selected channel thereof, relating to each frame of the television picture can at a later time be read from the RAM 3 by reference to the stored time code signal and synchronized with pictures reproduced from the DVTR 1 running at slow forward or reverse speeds.

When the operator uses the jog knob of the DVTR 1 or the edit controller 7 to view the video in slow motion on the picture monitor 2, the time code and speed (plus perhaps the position as indicated by capstan pulses) information from the DVTR 1 is supplied to the RAM controller 5, which causes replay of the corresponding part of the stored segment of audio at the appropriate speed (possibly with pitch correction) through the loudspeakers 4.

The RAM controller 5 also controls display of the waveform of the envelope of that part of the audio signal on the video screen 6, such that the cursor 8 is aligned with the audio information, which in turn is synchronized with the video frame being displayed on the picture monitor 2. By looking at the waveform, the operator can readily locate noise features, such as, for example, the silences between spoken words. Once the operator has found the required edit point, a key is depressed on the edit controller 7 to enter the edit point time code in the edit point register of the edit controller 7, so that a list of the required edit points can be built up for use in a subsequent editing process.

The RAM storage, control and display part of the apparatus could be used in conjunction with more than one DVTR in a multi-machine editing system.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method of identifying and selecting edit points in a digital audio signal recorded on a record medium in association with a video signal and a time code signal, the method comprising:

storing a segment of said digital audio signal and the associated time code signal in a random access memory; reproducing the associated video signal from the record medium and displaying a corresponding image on a monitor;

reading from said random access memory, by reference to the stored time code, a part of said segment of said digital audio signal which corresponds to the displayed image;

digital-to-analog converting the part of said segment of said digital audio signal read from the random access memory to an analog audio signal and audibly reproducing said analog audio signal;

displaying a waveform of said analog audio signal with a cursor positioned relative to said waveform in correspondence to the displayed image;

varying the position of said cursor relative to said waveform while correspondingly changing the displayed image;

selecting a position of said cursor relative to said waveform as an audio edit point; and storing a time code corresponding to said audio edit point.

2. A method according to claim 1, further comprising the step of displaying a time graph in association with said waveform and said cursor, said time graph being based upon the stored time code signal.

3. A method according to claim 1, further comprising the step of displaying time codes in numerical form in association with said waveform and said cursor, the displayed time codes corresponding to the stored time code signal.

4. A method according to claim 1 wherein the step of storing a time code corresponding to said audio edit point comprises storing the corresponding time code in an edit point register in an edit controller.

5. A method according to claim 1, wherein the step of reproducing the analog audio signal audibly comprises reproducing the analog audio signal by means of a loudspeaker.

6. Apparatus for identifying and selecting edit points in a digital audio signal recorded on a record medium in association with a video signal and a time code signal, the apparatus comprising:

random access memory means for storing a reproduced segment of said digital audio signal and the associated time code signal;

monitor means for displaying an image corresponding to a reproduced associated video signal;

means for reading from said random access memory means, by reference to the stored time code signal, a part of said segment of said digital audio signal which corresponds to the displayed image;

digital-to-analog converter means for converting the part of said segment of said digital audio signal read from the random access memory means to an analog audio signal;

means for audibly reproducing said analog audio signal;

video display means for displaying a waveform of said analog audio signal with a cursor positioned relative to said waveform in correspondence to the image displayed by said monitor means;

means for varying the position of said cursor relative to said waveform, while correspondingly changing the displayed image, for enabling selection of a position of said cursor relative to said waveform as an audio edit point; and time code storing means for storing a time code corresponding to said audio edit point.

7. Apparatus according to claim 6, wherein said video display means is operative to display a time graph in association with said waveform and said cursor, said time graph being based upon the stored time code signal.

8. Apparatus according to claim 6, wherein said video display means is operative to display time codes in numerical form in association with said waveform and said cursor, the displayed time codes corresponding to the stored time code signal.

9. Apparatus according to claim 6, wherein the time code storing means comprises an edit controller including an edit point register for storing the time code corresponding to said audio edit point.

10. Apparatus according to claim 6, wherein said means for reproducing the analog audio signal audibly comprises a loudspeaker.

* * * * *